United States Patent Office 2,867,504
Patented Jan. 6, 1959

---

2,867,504

PREPARATION OF POTASSIUM POLYPHOSPHATE

Peter William Brett Semmens, Norton-on-Tees, England, assignor to Imperial Chemical Industries Limited, Millbank, London, England, a corporation of Great Britain No Drawing. Application January 30, 1956
Serial No. 562,038

Claims priority, application Great Britain
January 20, 1956

5 Claims. (Cl. 23—106)

This invention relates to the preparation of potassium polyphosphate. This substance comprises substantially linear polymers having the formula $(KPO_3)_m$, and is commonly prepared by heating mono-potassium dihydrogen orthophosphate. The later salt is however a comparatively expensive material to use, and we have therefore developed a cheaper and more convenient method of preparing potassium polyphosphate by heating monammonium dihydrogen orthophosphate mixed with potassium chloride.

According to the present invention therefore potassium polyphosphate as hereinbefore defined is prepared by intimately mixing potassium chloride and monammonium dihydrogen orthophosphate which are preferably in finely divided form, and heating the mixture under conditions as hereinafter defined.

The relative proportions of the two components of the mixture are preferably equimolecular. However, if it is desired to produce a $K:P$ ratio in the polyphosphate product greater or less than unity, the relative proportions of the two components of the mixture may be adjusted accordingly. The temperature at which the mixture is heated should not exceed 800° C., since at this temperature, fusion commences, and is preferably about 700° C. In order to avoid too violent volatilisation of the ammonium chloride formed, it is preferred to heat the mixture first at a lower temperature, for example 200° C. to 300° C., for approximately one hour. The total time during which the mixture is heated is preferably approximately 3 hours.

The conditions under which the mixture is heated should be such that the ammonium chloride and water which are formed during the reaction are expelled from the mixture.

The advantages of the process of the present invention are that the starting materials potassium chloride and monammonium dihydrogen orthophosphate are readily available, and that the process is simpler and more economic than processes which involve the preparation of potassium dihydrogen orthophosphate. In particular, the $K:P$ ratio in the final product is readily adjustable by controlling the proportions of the two components before the mixture is heated.

The removal of the volatile by-products during heating may be facilitated by the passage of a stream of inert gas over the mixture, and the mixture may be agitated during heating and may also be agitated after heating.

Potassium polyphosphate prepared by the process of the present invention is valuable in the preparation of other polyphosphates, and in particular it may be used in the preparation of organic polyphosphates, such as the organic polyphosphates which form the basis of boundary lubricants described in our co-pending British application No. 26,265/54. In addition, in our co-pending British application No. 29,305/55 it is a preferred feature that the potassium polyphosphate which is used therein should have a $K:P$ atomic ratio less than 1; this can readily be brought about by preparing the potassium polyphosphate according to the process of the present invention.

The process of the present invention may be illustrated from the following example.

*Example*

18.6 grams of powdered potassium chloride and 28.8 grams of powdered mono-ammonium dihydrogen orthophosphate were intimately mixed and heated in an open tube, at 200° to 300° C. for ¾ hour. The temperature was then raised to 675° C. for 2 hours. On cooling, the product showed the following analysis:

| | Percent |
|---|---|
| K | 32.9 |
| P | 26.0 |
| N | Nil |
| Cl | Nil |

This corresponds to a theoretical analysis for $KPO_3$ of

| | Percent |
|---|---|
| K | 33.1 |
| P | 26.2 |

I claim:

1. A process for the preparation of water-insoluble potassium polyphosphate which comprises heating an intimate mixture comprising ammonium dihydrogen orthophosphate and potassium chloride at a temperature between 200° C. and 300° C., for approximately one hour, and thereafter heating said mixture at a temperature of about 700° C. for about two hours.

2. A process for the preparation of water-insoluble potassium polyphosphate which comprises first heating an intimate mixture of ammonium dihydrogen orthophosphate and potassium chloride at a temperature between 200° C., and 300° C. for up to about 1 hour and, until a substantial amount of ammonium chloride and water is vaporized therefrom and thereafter heating the thus heated mixture at a temperature between 400 and 800° C., for up to about two hours and until said water insoluble potassium polyphosphate is obtained, said two stage heat treatment not exceeding a maximum of approximately three hours.

3. A process according to claim 2 in which said mixture is heated in a stream of inert gas.

4. A process according to claim 2 in which said mixture is agitated.

5. A process according to claim 2 in which said mixture comprises equimolecular proportions of ammonium dihydrogen orthophosphate and potassium chloride.

References Cited in the file of this patent

UNITED STATES PATENTS 2,288,418    Partridge _____ June 30, 1942

FOREIGN PATENTS 683,027    France _____ June 5, 1930